(12) United States Patent
Fujimori et al.

(10) Patent No.: US 9,590,451 B2
(45) Date of Patent: Mar. 7, 2017

(54) AUTONOMOUS POWER SUPPLY SYSTEM

(71) Applicant: Hitachi, Ltd., Chiyoda-ku, Tokyo (JP)

(72) Inventors: Tsukasa Fujimori, Tokyo (JP); Yasushi Goto, Tokyo (JP); Hideaki Kurata, Tokyo (JP); Hideaki Takano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 299 days.

(21) Appl. No.: 14/323,694

(22) Filed: Jul. 3, 2014

(65) Prior Publication Data

US 2015/0008872 A1 Jan. 8, 2015

(30) Foreign Application Priority Data

Jul. 5, 2013 (JP) ................. 2013-141840

(51) Int. Cl.
  *H02J 7/00* (2006.01)
  *H02J 7/14* (2006.01)
  *H02J 7/34* (2006.01)
  *H02J 7/35* (2006.01)

(52) U.S. Cl.
  CPC ............ *H02J 7/345* (2013.01); *H02J 7/0013* (2013.01); *H02J 7/0063* (2013.01); *H02J 7/007* (2013.01); *H02J 7/0054* (2013.01); *H02J 7/0055* (2013.01); *H02J 7/35* (2013.01); *H02J 2007/0067* (2013.01)

(58) Field of Classification Search
  USPC ....... 320/101, 103, 138, 137, 104, 140, 110, 320/116, 118, 119, 128, 108, 114; 307/66, 46, 48
  See application file for complete search history.

(56) References Cited

U.S. PATENT DOCUMENTS

| 5,811,958 A | * | 9/1998 | Yamamoto | ................ H02J 7/35 320/101 |
| 5,869,950 A | * | 2/1999 | Hoffman, Jr. | ............ B60K 6/28 320/103 |
| 6,066,936 A | * | 5/2000 | Okamura | .............. H02J 7/1415 320/103 |

(Continued)

FOREIGN PATENT DOCUMENTS

JP  2010-104117 A  5/2010
JP  2013-27183 A  2/2013

*Primary Examiner* — Alexis A Boateng
(74) *Attorney, Agent, or Firm* — Crowell & Moring LLP

(57) ABSTRACT

An autonomous power supply system includes a generation control circuit which controls power generation efficiency of a power generation element, a group of storage elements for charging electric power generated by the power generation element, and a charging control circuit which controls a charging operation and a discharging operation of the storage element group. The storage element group includes a primary storage element for supplying electric power to the generation control circuit and the charging control circuit, and secondary storage elements for supplying electric power to a loading device. The electric power generated by the power generation element charges the primary storage element preferentially, and the secondary storage elements subsequent to the primary storage element. A capacity value of the primary storage element is set to be smaller than a capacity value of the secondary storage elements.

8 Claims, 6 Drawing Sheets

(56) References Cited

U.S. PATENT DOCUMENTS

| | | | | |
|---|---|---|---|---|
| 6,326,764 B1* | 12/2001 | Virtudes | ............ | H02J 7/355 |
| | | | | 320/101 |
| 6,541,940 B1* | 4/2003 | Jungreis | ............ | H01M 10/4207 |
| | | | | 320/103 |
| 7,095,213 B2* | 8/2006 | Weng | ............ | H02J 7/0068 |
| | | | | 307/48 |
| 7,567,057 B2* | 7/2009 | Elder | ............ | B60L 3/0046 |
| | | | | 307/10.6 |
| 7,745,025 B2* | 6/2010 | Leach | ............ | H02J 7/0018 |
| | | | | 320/101 |
| 7,948,212 B2* | 5/2011 | Odaohhara | ............ | H02J 7/047 |
| | | | | 320/128 |
| 8,004,113 B2* | 8/2011 | Sander | ............ | H02J 7/35 |
| | | | | 307/46 |
| 8,120,308 B2* | 2/2012 | Ward | ............ | B60L 8/003 |
| | | | | 180/2.1 |
| 8,692,506 B2* | 4/2014 | Saito | ............ | B60L 3/0046 |
| | | | | 320/103 |
| 9,287,702 B2* | 3/2016 | Proefrock | ............ | G06F 1/266 |
| 2005/0253560 A1* | 11/2005 | Popescu-Stanesti | ............ | H02J 1/08 |
| | | | | 320/138 |
| 2009/0096399 A1* | 4/2009 | Chen | ............ | H01M 10/44 |
| | | | | 318/441 |
| 2010/0060231 A1* | 3/2010 | Trainor | ............ | H01G 11/14 |
| | | | | 320/103 |
| 2013/0020880 A1 | 1/2013 | Asai et al. | | |
| 2014/0002003 A1* | 1/2014 | Kim | ............ | H02J 7/00 |
| | | | | 320/103 |
| 2014/0152234 A1* | 6/2014 | Herrmann | ............ | H02J 7/007 |
| | | | | 320/107 |

* cited by examiner

F I G. 3

CHARGE CONTROL RULE

|  | STATE SHOWING POSSIBILITY OF EACH STORAGE ELEMENT DISCHARGE | | | | | | STORAGE ELEMENT TO BE CHARGED |
| --- | --- | --- | --- | --- | --- | --- | --- |
|  | C1 | C2 | C3 | C4 | C5 | C6 | |
| RULE | × | – | – | – | – | – | C1 |
|  | ○ | × | – | – | – | – | C1→C2 |
|  | ○ | ○ | × | – | – | – | C1→C3 |
|  | ○ | ○ | ○ | × | – | – | C1→C4 |
|  | ○ | ○ | ○ | ○ | × | – | C1→C5 |
|  | ○ | ○ | ○ | ○ | ○ | × | C1→C6 |
| EXAMPLE1 | ○ | × | ○ | ○ | × | × | C1→C2 |
| EXAMPLE2 | × | × | ○ | ○ | × | ○ | C6→C1 |

○: DISCHARGE POSSIBLE
×: DISCHARGE IMPOSSIBLE
–: IRRELEVANT

AUTONOMOUS POWER SUPPLY SYSTEM

CLAIM OF PRIORITY

The present application claims priority from Japanese patent application serial No. JP 2013-141840, filed on Jul. 5, 2013, the content of which is hereby incorporated by reference into this application.

BACKGROUND OF THE INVENTION (1) Field of the Invention

The invention relates to an autonomous power supply system which supplies electric power to electronic equipment using a power generation element.

(2) Description of the Related Art

In the case where the electronic equipment is installed in an isolated place with difficulty in receiving power supply, it is effective to employ the autonomous power supply system provided with a power generation element such as a solar cell so as to allow unmanned operation without receiving power supply from external commercial power source. JP-A-2010-104117 discloses the above-described power supply system which enables extraction of electric power from the solar cell with high efficiency even if the period of daylight in cloudy weather frequently fluctuates. JP-A-2010-104117 discloses that any one of the storage battery and a plurality of capacitors (capacitor module), which constitute the power storage device is charged with electric power generated by the solar cell in accordance with the insulation fluctuation, and the capacitors are switched in sequence by calculating the time for charging the capacitor from the charging current that can be extracted from the solar cell.

SUMMARY OF THE INVENTION

JP-A-2010-104117 discloses that the generation control circuit called MPPT (Maximum Power Point Tracking) charging unit is employed for the purpose of efficiently extracting electric power from the solar cell. The autonomous power supply system is configured to receive partial supply of electric power generated by the solar cell to the generation control circuit for operation. However, it is necessary to apply minimum voltage (hereinafter referred to as control start voltage) in order to normally operate the generation control circuit. If the electric power generated by the solar cell is small, a long period of time will be necessary until the supply voltage reaches the control start voltage. For the aforementioned period of time, there is no choice but to use the solar cell in the low efficient state without starting the generation control circuit. This may cause the problem of delay in the power supply to the electronic equipment (loading device). This problem is not considered in JP-A-2010-104117. The problem will be described referring to the drawing.

FIG. 5 illustrates a structure of a wireless sensor terminal to be described later in the embodiment as the electronic equipment provided with a generally employed autonomous power supply system. A wireless sensor terminal 200 employs the autonomous power supply system which includes a power generation element 2, a generation control circuit 4, a storage element C0, a voltage monitor circuit 11, and a power output unit 9 so as to supply electric power to a loading device 10. The loading device 10 includes a sensor 10a, an AD converter 10b, a CPU 10c and a wireless unit 10d for realizing the sensor function.

The storage element C0 is charged with electric power generated by the power generation element 2 through the generation control circuit 4. The generation control circuit 4 conducts MPPT control and boosting to allow the power generation element 2 to efficiently generate electric power. The voltage monitor circuit 11 monitors a voltage V0 charged by the storage element C0, and operates a switch S0 upon detection that the voltage has reached the level sufficient to drive the loading device 10. The electric power is then supplied to the loading device 10 via the power output unit 9. The autonomous power supply system is configured to operate the generation control circuit 4 with electric power generated by the power generation element 2 and charged by the storage element C0. However, it is necessary to apply a predetermined voltage (control start voltage) to normally operate the generation control circuit 4. A predetermined period of time is required for the voltage V0 of the storage element C0 to reach the control start voltage at the time when the power generation element 2 starts power generation. Then the timing for power supply to the loading device 10 delays correspondingly to such period of time.

FIG. 6 represents change with time in the power storage voltage V0 of the storage element C0 as shown in FIG. 5. It is assumed that the control start voltage for starting the generation control circuit 4 is set to Vc. It is also assumed that the power generation is started at a time t0, and the time at which the power storage voltage V0 reaches the control start voltage Vc is set to t1. In the time segment from t0 to t1, the generation control circuit 4 does not start. Therefore, the generation efficiency (generated electric power per unit of time) of the power generation element 2 is low. As the generation control circuit 4 is started at the time t1 onward, the generation efficiency of the power generation element 2 becomes high. The time t1 at which the power storage voltage V0 reaches the voltage Vc is determined in accordance with power generation of the power generation element 2 and a capacity value of the storage element C0.

Originally, the power generation method that allows the power generation element 2 to collect environmental energy (for example, environmental light) only provides minimal electric power generation. This may inevitably prolong the period of time taken to the time t1. Meanwhile, as the storage element C0 is used as the power source for the loading device 10, it has to be configured with sufficient capacity value in accordance with power consumption of the loading device 10. If capacity of the storage element C0 is increased, the time t1 is increased to t1' correspondingly. In other words, any of the aforementioned factors may cause the problem of prolonging the standby time until the supply of required electric power necessary to the loading device 10.

The present invention provides an autonomous power supply system capable of supplying electric power to a loading device in a short time by quickly starting the generation control circuit irrespective of minimal electric power generated by the power generation element.

The present invention provides the autonomous power supply system for supplying electric power generated by a power generation element to a loading device, which includes a generation control circuit which controls power generation efficiency of the power generation element, a storage element group which charges the electric power generated by the power generation element, and a charging control circuit which controls a charging operation and a discharging operation of the storage element group. The storage element group includes a primary storage element for supplying electric power to the generation control circuit and the charging control circuit, and a secondary storage element for supplying electric power to the loading device. The primary storage element is charged with the electric power generated by the power generation element preferentially, and subsequently, the secondary storage element is charged. The capacity value of the primary storage element is made smaller than the capacity value of the secondary storage element.

The present invention is capable of providing the autonomous power supply system which ensures power supply to the loading device in a short time by quickly starting the generation control circuit irrespective of minimal electric power generated by the power generation element.

BRIEF DESCRIPTION OF THE DRAWINGS

These and other features, objects and advantages of the present invention will become more apparent from the following description when taken in conjunction with the accompanying drawings wherein:

FIG. 3 represents charge control rules for determining the storage element to be charged;

DETAILED DESCRIPTION OF THE EMBODIMENT

An embodiment of the present invention will be described, taking a wireless sensor terminal with an autonomous power supply system as an example.

Figure 1:
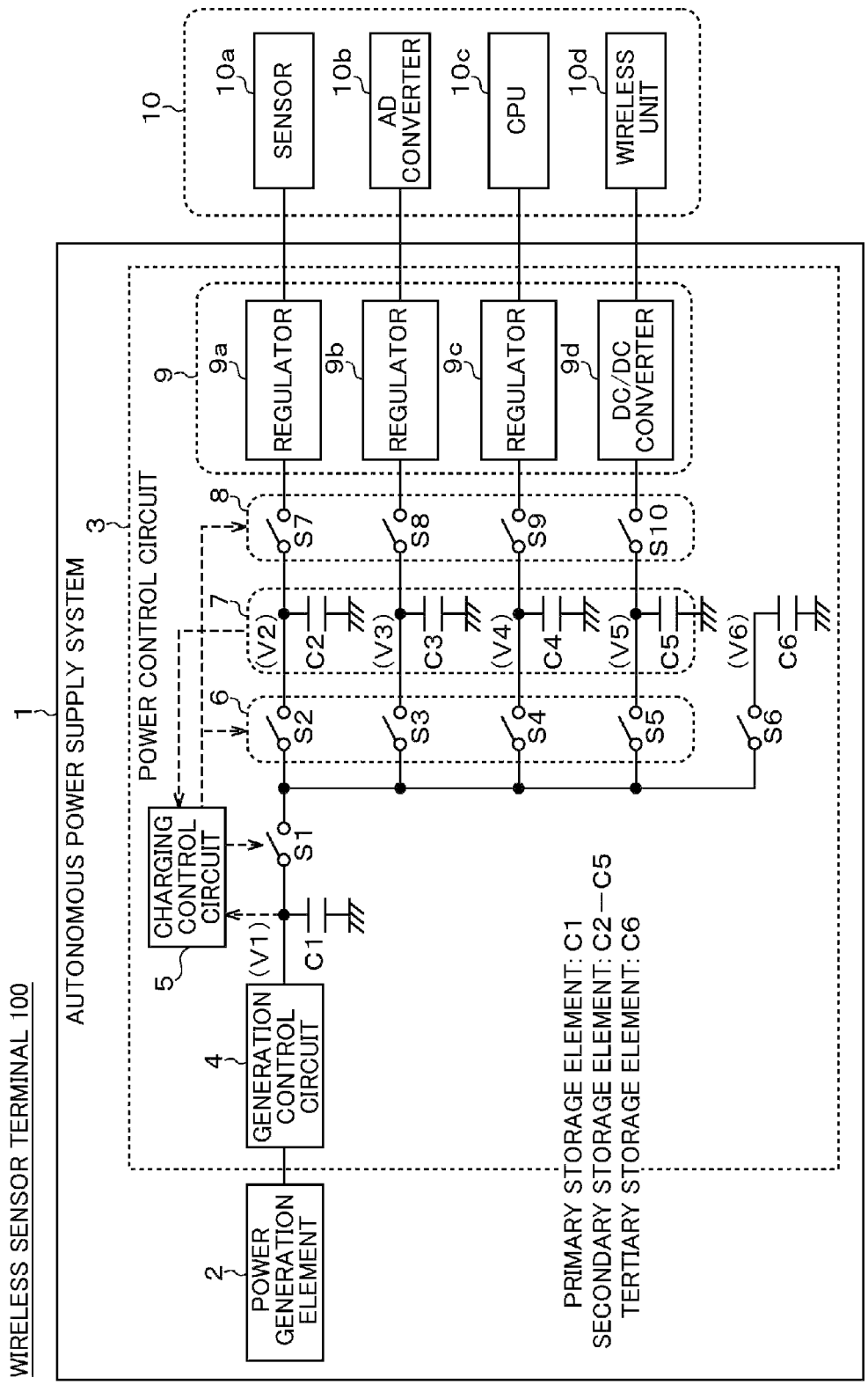
FIG. 1 illustrates a structure of a wireless sensor terminal with an autonomous power supply system according to an embodiment.

FIG. 1 illustrates a structure of the wireless sensor terminal with the autonomous power supply system according to the embodiment. A wireless sensor terminal 100 is a terminal which includes an autonomous power supply system 1 to realize sensor functions by generating electric power to operate a loading device 10. The sensor function is designed to measure various types of surrounding physical quantity, and wirelessly transmit measurement results to external equipment.

The autonomous power supply system 1 includes a power generation element 2, and a power control circuit 3 which supplies generated electric power from the power generation element 2 to the loading device 10.

The power generation element 2 serves to collect environmental energy such as environmental light, vibration, heat and radio wave, and to convert the collected energy into electric energy. In addition to the solar cell, a vibration power generation element and thermoelectric device may be employed. It may also be configured by connecting different power generation elements so as to ensure collection of not only the single type but also multiple types of environmental energy. Generally, the environmental energy is minimal and unstable. The electric power which can be supplied by the power generation element 2 is very low, ranging from several tens to several hundreds μW. Furthermore, it is difficult to ensure stable power supply owing to environmental fluctuation. Accordingly, it is necessary to allow a generation control circuit 4 to be described later to efficiently extract the electric power.

The power control circuit 3 controls power generation of the power generation element 2, and supplies electric power to the respective loading blocks of the loading device 10 while charging a storage element with the generated electric power from the power generation element 2. The power control circuit 3 includes the generation control circuit 4, a charging control circuit 5, storage elements C1 to C6, a power output unit 9, and switches S1 to S10.

The generation control circuit 4 controls the power generation element 2 to efficiently generate electric power under MPPT (Maximum Power Point Tracking) control. Generally, the power generation element 2 which converts the environmental energy into electric energy has extractable amount of energy variable in accordance with magnitude of the load. For this, the generation control circuit 4 adjusts load resistance in accordance with the power generation state to maximize the power generation efficiency of the power generated element 2. The generation control circuit 4 is operable to boost, fall, and rectify the voltage of power generated by the power generation element 2 as needed. The storage element C1 is charged with the generated electric power outputted from the generation control circuit 4.

The charging control circuit 5 charges the storage elements C2 to C6 in sequence with electric power charged by the storage element C1 by operating the switches S1 to S6. In parallel with charging as described above, the electric power charged by the storage elements C2 to C5 is outputted to the respective blocks 9a to 9d of the power output unit 9 by operating the switches S7 to S10 (switch group 8). The electric power is then supplied to the corresponding loading blocks 10a to 10d of the loading device 10. At this time, each state of voltages V1 to V6 of the storage elements C1 to C6 is monitored to judge whether or not it is possible to discharge through comparison with predetermined threshold values Va and Vb. The switches S1 to S10 are operated to control charging and discharging of the storage elements C1 to C6 based on the charge control rules and the required specification for the loading device 10. According to the charge control rules, priority order of charging the storage elements C1 to C6 is determined so that the highest priority is given to the storage element C1, and the subsequent priorities are given to those C2, C3 and so forth sequentially. The charge control executed by the charging control circuit 5 will be described in detail later.

The switches S1 to S10 are controlled so that the flow of electric charge into or from the storage element is allowed in ON state, and is blocked in OFF state. A generally employed switching element such as the field effect transistor is used as the switch. It is preferable to use the switch that exhibits low resistance in ON state, and high resistance in OFF state.

The storage elements C1 to C6 are functionally grouped into three types of elements. The storage element C1 is classified as "primary storage element", the storage elements C2 to C5 (designated as a reference numeral 7) are classified as "secondary storage elements", and the storage element C6 is classified as "tertiary storage element". The storage element C1 as the primary storage element is charged with electric power which is generated by the power generation element 2 and outputted from the generation control circuit 4 (that is, stores the charge). When the voltage of the storage element C1 reaches the predetermined value, the charge stored in the storage element C1 is supplied to the storage elements C2 to C5 as the secondary storage elements and to the storage element C6 as the tertiary storage element via the switches S1 to S6. The secondary storage elements are configured to connect those multiple storage elements C2 to C5 in parallel corresponding to the block structure of the loading device 10. The storage element C6 as the tertiary storage element serves as a backup for supplying the charge to the storage elements C1, and C2 to C5 when the power generation element 2 becomes unable to generate electric power. The switches S2 to S5 for inputting corresponding to the storage elements C2 to C5 as the secondary storage elements will be referred to as a switch group 6, and the output switches S7 to S10 for outputting will be referred to as a switch group 8. Capacity setting and operations of the respective storage elements will be described.

The storage element C1 as the primary storage element supplies stored charge to the secondary storage elements C2 to C5 and the tertiary storage element C6, as well as supplies electric power to the generation control circuit 4 and the charging control circuit 5 for operation. The voltage equal to or higher than the control start voltages Vc and Vc' is required to operate the generation control circuit 4 and the charging control circuit 5. It is therefore necessary to allow the voltage of the storage element C1 to reach the voltages Vc, Vc' in a short time so as to quickly start the generation control circuit 4 and the charging control circuit 5.

The voltage V of the storage element is derived from the equation of $V=Q/C$ (Q: quantity of stored charge, C: capacity). The smaller the capacity of the storage element C1 is, the faster the voltage V increases. Accordingly, the capacity of the storage element C1 is set to the minimum necessary value for operating the generation control circuit 4 and the charging control circuit 5, and to be smaller than those of the storage elements C2 to C6. Specifically, it is set to be in the range from 10 to 500 µF approximately in consideration of power generation capability of the power generation element 2 and electric power consumed by the generation control circuit 4 and the charging control circuit 5. This makes it possible to quickly start the generation control circuit 4 and the charging control circuit 5 as well as stably operate those circuits.

The storage elements C2 to C5 as the secondary storage elements store the charge supplied from the storage element C1, and function as the power source for operating the respective loading blocks 10a to 10d of the loading device 10. In this embodiment, the storage element C2 is connected to the sensor 10a, the storage element C3 is connected to the AD converter 10b, the storage element C4 is connected to the CPU 10c, and the storage element C5 is connected to the wireless unit 10d via the switch group 8 and the power output unit 9, respectively. Each capacity of the storage elements C2 to C5 is determined in accordance with the operation specification of the corresponding loading block as the connection destination. In this embodiment, the minimum necessary charge for performing a series of operations derived from the sensor function may be stored while considering frequency of such operations to be performed. Specifically, it is set to be in the range from 500 to 10000 µF approximately in accordance with power consumption of the respective loading blocks.

The storage element C6 as the tertiary storage element stores the charge further supplied from the storage element C1 after completion of charging of the storage elements C2 to C5 as the secondary storage elements. When the power generation element 2 becomes unable to generate electric power, the storage element C6 substitutes for the power generation element 2 as the backup element for charging the storage elements C2 to C5. The charge is transferred from the storage element C6 to the storage elements C2 to C5 via the switches S6, and S2 to S5 (switch group 6). In this embodiment, the capacity of the storage element C6 is set to be larger than the total capacity value of the storage elements C1 to C5 for the purpose of storing electric power generated by the power generation element 2 without any waste. Specifically, it is set to be in the range from approximately 10 to 1000 mF without any waste.

Those storage elements C1 to C6 are structured as capacitors of appropriate types, for example, electrolytic capacitor, tantalum electrolytic capacitor, laminated ceramic capacitor, electric double layer capacitor and the like. A plurality of capacitors may be connected in parallel to achieve the appropriate capacity as necessary. Especially, the laminated ceramic capacitor is suitable for the use as the storage elements C1 to C5 as it is preferable to exhibit the low leak current and small inner resistance. The storage element with large capacity, for example, electric double layer capacitor is suitable for the use as the storage element C6. It is possible to employ the secondary battery as the storage element C6. However, as its life with repetitive charge-discharge property is generally shorter than that of the capacitor, it is preferable to employ the capacitor. In the case where the secondary battery is employed, it is preferable to use the one with longer life with repetitive charge-discharge property such as the thin film lithium ion secondary battery of all-solid type.

The power output unit 9 is a voltage stabilizing circuit which stabilizes electric power supplied from the storage elements C2 to C5 so as to be applied to the respective loading blocks 10a to 10d of the loading device 10 at a predetermined voltage. In this embodiment, the storage elements C2 to C5 are operated independently from one another, which are configured with the different voltage stabilizing circuits corresponding to the loading blocks. The most suitable voltage stabilizing circuit is selected by taking into account frequency of the operation and current consumption of the loading block to be connected. Specifically, regulator circuits 9a to 9c each with low self current consumption and low loss (low dropout) may be employed for the circuit that demands higher current consumption upon initializing operation, and the loading block requiring long energizing period for data retention and stabilization such as the sensor 10a, AD converter 10b and CPU 10c. The DC/DC conversion circuit 9d with high self current consumption but high efficiency may be employed for the loading block such as the wireless unit 10d that does not have to be constantly energized.

The structure of the loading device 10 will be described. The loading device 10 which realizes the sensor function of the embodiment includes the sensor 10a, the AD converter 10b, the CPU 10c and the wireless unit 10d.

The sensor 10a measures environmental information of the area around the place where the wireless sensor terminal 100 is installed, and operation status of the equipment. For example, the sensor measures various types of physical quantity such as temperature, humidity, vibration, acceleration, sound wave, gas, dust, illuminance, light, magnetic field and current, which will be converted into analog signals. In addition to the single sensor, multiple types of sensors may be employed. It is to be understood that the measurement target is not limited to the physical quantity as described above. It may be applied not only to the sensor for outputting the analog signals but also the sensor for outputting digital signals. The aforementioned case does not require the use of the AD converter 10b, and accordingly, the digital output signal of the sensor 10a may be connected to the CPU 10c.

The AD converter 10b converts the analog signal outputted from the sensor 10a into the digital signal. If necessary, an appropriate amplifier circuit may be inserted between the sensor 10a and the AD converter 10b so that the analog signal is amplified. The AD converter 10b may be configured to be included either in the sensor 10a or the CPU 10c.

The CPU 10c controls each start-up timing of the loading blocks in the loading device 10, and executes data storage, signal processing, encryption, encoding and the like as needed, in response to the measurement signal of the sensor 10a, which has been derived through the AD converter 10b so as to generate wirelessly transmittable data.

The wireless unit 10d transmits the data generated by the CPU 10c to the external equipment. The wireless system suitable for the usage and installation environment may be selected and used.

As the autonomous power supply system 1 provided in the wireless sensor terminal 100 according to the embodiment utilizes environmental energy, electric power derived from the power generation element 2 is likely to become minimal and unstable. Therefore, it is difficult to continuously operate the above-structured loading device 10. The sensor measurement and the wireless transmission will be executed intermittently at predetermined intervals.

It is assumed that the sensor 10a, the AD converter 10b, the CPU 10c and the wireless unit 10d are brought into sleep mode for maintaining only the minimum circuit operation after execution of the initializing setting of the loading device 10. Then the timer circuit built in the CPU 10c is used to generate interrupt signals at the interval of once in 60 seconds, for example. The interrupt signal serves to start the main operation of the CPU 10c which generates the signal for sequentially operating the sensor 10a and the AD converter 10b for sensor measurement. The CPU 10c executes the required signal processing and encoding with respect to the obtained sensor measurement signal in accordance with the preset program, and starts the wireless unit 10d for data transmission. Thereafter, the sensor 10a, the AD converter 10b, the CPU 10c and the wireless unit 10d are brought into the sleep mode again, and left in a standby state until generation of the next interrupt signal.

The charging control operation performed by the charging control circuit 5 will be described in detail.

Figure 2:
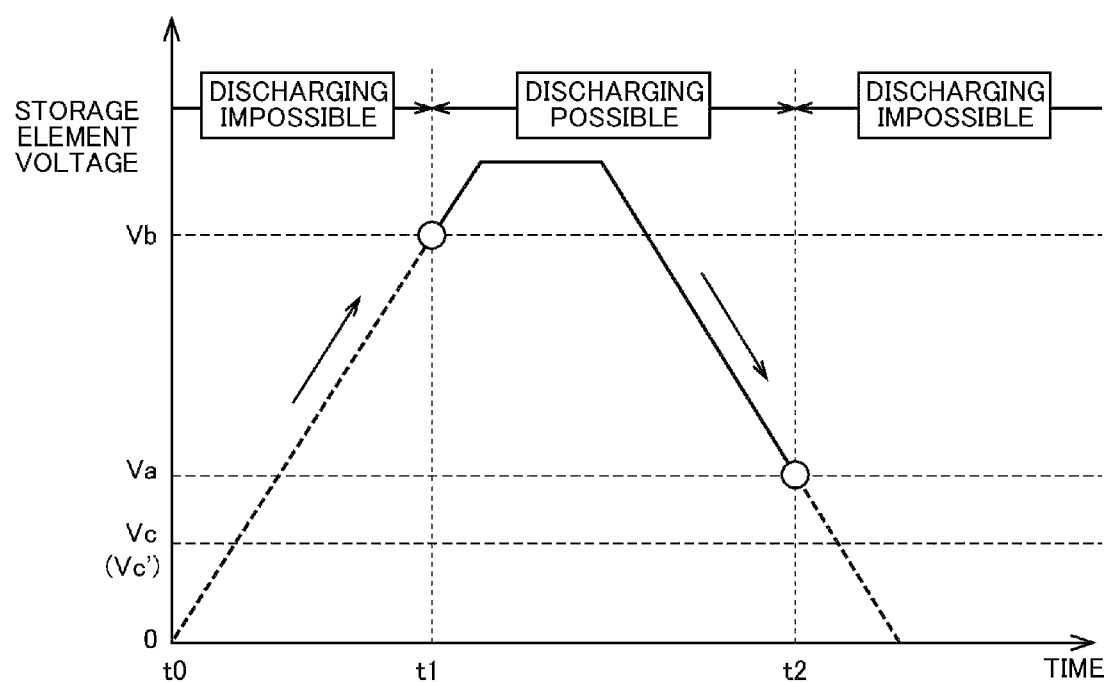
FIG. 2 is an explanatory view of a method of judging whether or not it is possible to discharge the respective storage elements.

FIG. 2 is an explanatory view of a judgment method on possibility of discharging the respective storage elements. The y-axis represents voltage of the storage element, and the x-axis represents time. Two threshold voltage values Va and Vb (Va<Vb) are set for judgment on possibility of discharge. The threshold voltage values Va and Vb are set to be higher than the control start voltage values Vc and Vc' of the generation control circuit 4 and the charging control circuit 5. They are also set to be higher than each operation voltage of the respective loading blocks in the loading device 10. Upon start of charge at the time t0, the voltage of the storage element rises to reach the threshold value Vb at the time t1. In the time segment (t0-t1) until the time when the voltage reaches the threshold value Vb, judgment is made that it is impossible to discharge. At the time after the voltage has reached the threshold value Vb, judgment is made that it is possible to discharge. In other words, the threshold value Vb represents the discharge completion point of the storage element. After completion of charge, the voltage of the storage element drops as a result of discharge, and it reaches the threshold value Va at the time t2. In the time segment (t1-t2) until the time when the voltage reaches the threshold value Va, judgment is made that it is possible to discharge. After the voltage has reached the threshold value Va, judgment is made that it is impossible to discharge. As described above, the judgment on possibility of discharge is made based on hysteresis in comparison with those two threshold values Va and Vb. Such operation may be realized using a hysteresis comparator circuit and the like.

FIG. 3 is a table representing charge control rules for determining the storage element to be charged. The charging control circuit 5 determines the storage element to be charged based on the state showing possibility of discharging the respective storage elements, which has been judged as shown in FIG. 2 in reference to FIG. 3. States showing possibility of discharging the respective storage elements C1 to C6 are indicated as "discharge is possible" (O), "discharge is impossible" (×), and "irrelevant" (−), respectively. In the example, the table presents six rules. Arbitrary combination of the discharge possibility states of the respective storage elements C1 to C6 corresponds to any one of those rules.

The rules will be described in order from the top. If it is impossible to discharge the storage element C1, it is charged irrespective of states of other storage elements. If it is possible to discharge the storage element C1, and it is impossible to discharge the storage element C2, the C2 is charged subsequent to the C1 irrespective of states of other storage elements. If it is possible to discharge the storage elements C1 and C2, and it is impossible to discharge the storage element C3, the C3 is charged subsequent to the C1 irrespective of states of other storage elements. Further explanations will be omitted. The aforementioned charge control rules make it possible to charge the storage elements C1, C2, C3, . . . C6 in this order of priority.

Referring to Example 1, if it becomes impossible to discharge the C2 after completion of charging the C1 to C4, charging of the C5 is interrupted, and the operation is switched to charge the C2 with higher priority. Referring to Example 2, if it is possible to discharge the backup C6, and it is impossible to discharge the C1 and C2, the C1 with higher priority is charged subsequent to the C6.

As for setting of the order of priority, the storage element C1 is set to have the highest priority so that the generation control circuit 4 and the charging control circuit 5 are started in a short time. The order of priority of the storage elements C2 to C5 for power supply to the loading device 10 is determined in accordance with the priority of the loading block operation. Referring to the example shown in FIG. 1, the sensor 10a has the higher priority, and the wireless unit 10d has the lower priority.

When the storage element to be charged is determined, the charging control circuit 5 operates the corresponding switch from S1 to S6 to charge the subject storage element. The aforementioned charging operation is performed so that two or more switches of the switch group 6 (S2 to S5) are not simultaneously brought into ON state for the purpose of preventing the priority order of the charging quantity from being disordered resulting from mutual charge transfer among the secondary storage elements C2 to C5.

If the power generation element 2 becomes unable to generate electric power, and charge of the storage elements C1 to C5 is performed from the backup storage element C6, the charging control circuit 5 selects the switch group 6 (S2 to S5) while retaining ON state of the switches S1 and S6 so as to charge the storage elements C2 to C5 in accordance with the priority order.

Figure 4:
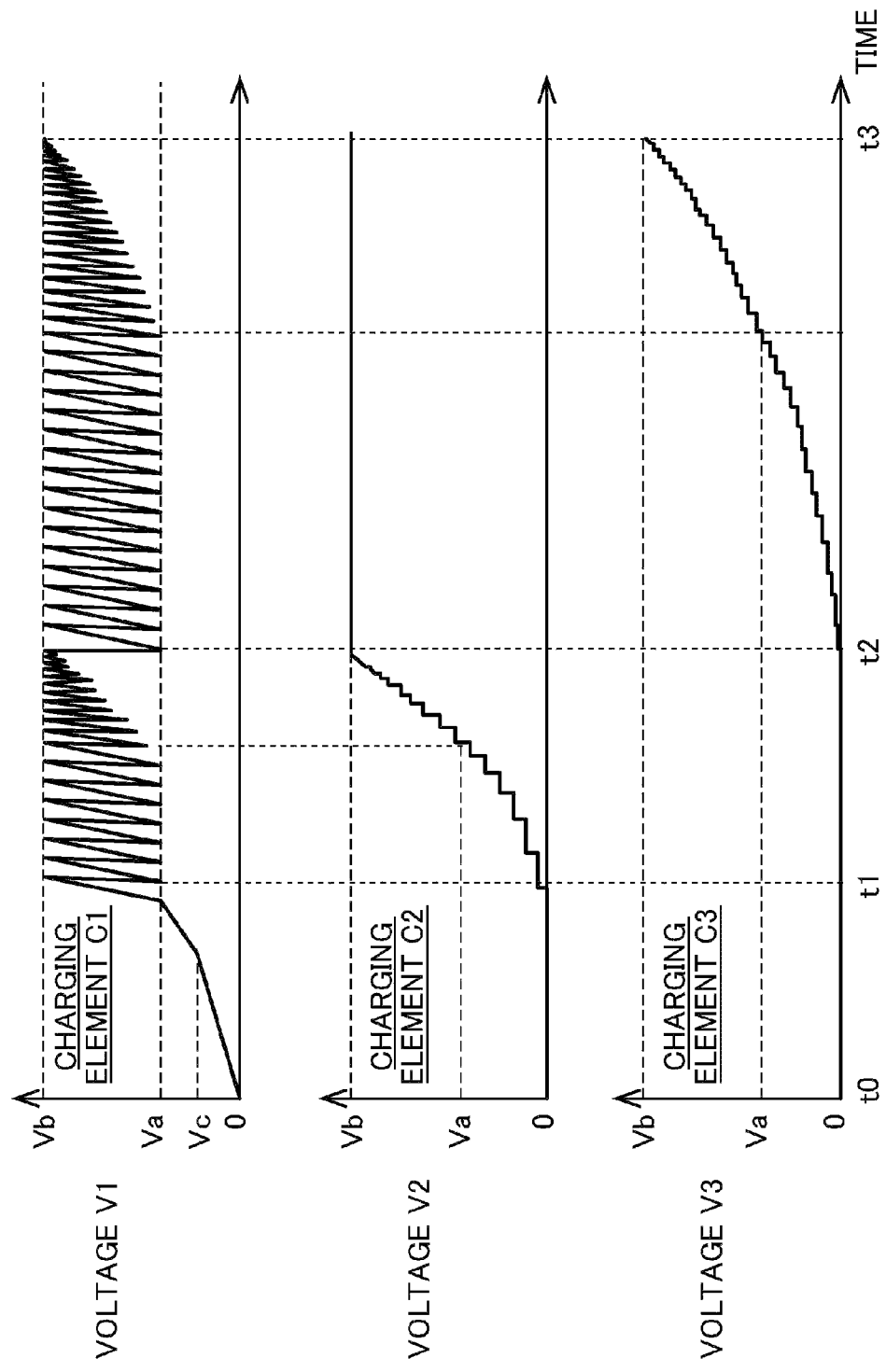
FIG. 4 graphically shows each voltage change in the respective storage elements in sequential charging.
Figure 5:
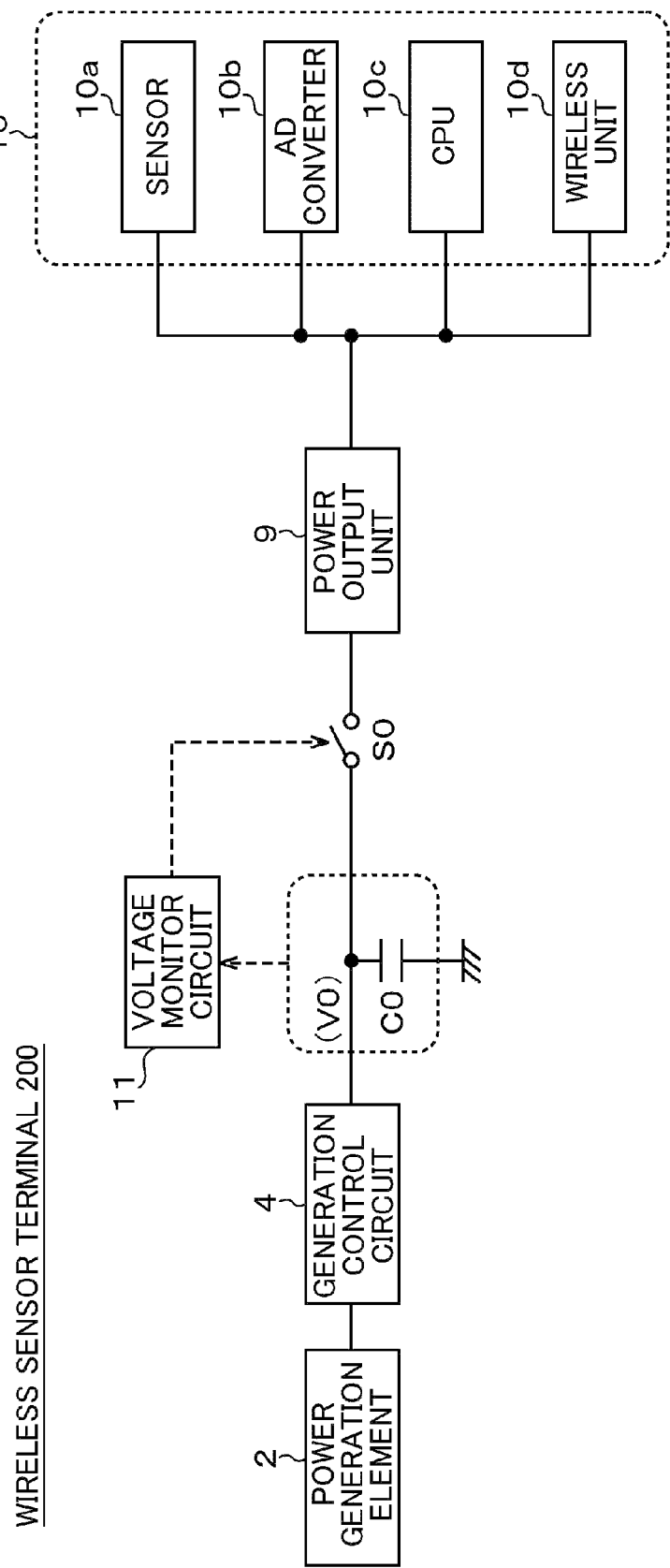
FIG. 5 illustrates the structure of a wireless sensor terminal with a generally employed autonomous power supply system.
Figure 6:
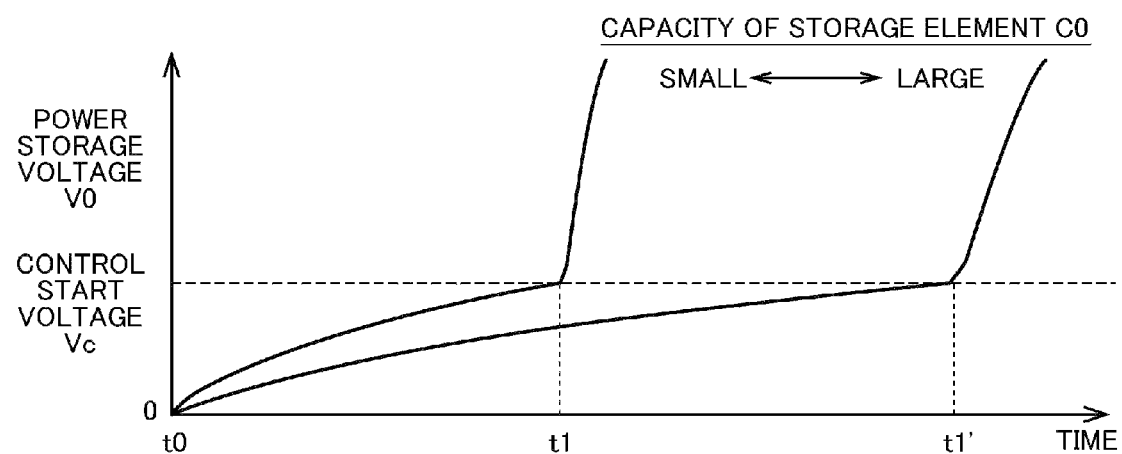
FIG. 6 is a view representing change with time in the power storage voltage V0 of the storage element C0 as shown in FIG. 5.

FIG. 4 graphically illustrates each voltage change in the respective storage elements to be charged sequentially. The graph represents charge of the storage elements C1, C2, C3, . . . in this order according to the charge control rules.

In the initial state (time t0), all the storage elements C1 to C6 are uncharged (impossible to discharge), and all the switches S1 to S10 are in OFF states. The aforementioned states are left in a standby state until the power generation element 2 charges the storage element C1 so that its voltage V1 is increased to reach the threshold value Vb.

When the voltage V1 of the storage element C1 reaches the threshold value Vb at the time t1, the charging control circuit 5 judges that it is possible to discharge. Then the switches S1 and S2 are brought into ON state so as to connect the storage elements C1 and C2. This transfers charges stored in the C1 to the C2. However, since the capacity of the C2 is larger than that of the C1, the voltage V1 of the C1 significantly drops, and the voltage V2 of the C2 slightly increases. When the voltage V1 of the C1 drops to the threshold value Va, the charging control circuit 5 judges that it is impossible to discharge, and brings the switches S1 and S2 into OFF state. Then the C1 is charged again, and left in a standby state until the voltage V1 is increased to reach the threshold value Vb. Thereafter, the charging control circuit 5 repeatedly executes the process for transferring the charge from the C1 to C2, and charging the C1 until the voltage V2 of the C2 reaches the threshold value Vb to allow discharging.

When the voltage V2 of the storage element C2 reaches the threshold value Vb at the time t2, the charging control circuit 5 judges that it is possible to discharge the C2, and brings the switch S1 into ON state, the S2 into OFF state, and the S3 into ON state. Then connection between the storage elements C1 and C2 is released, and the storage elements C1 and C3 are connected. Then the charge stored in the C1 is transferred to the C3. Since capacity of the C3 is larger than that of the C1, the voltage V1 of the C1 significantly drops, and the voltage V3 of the C3 is slightly increased. When the voltage V1 of the C1 drops to reach the threshold value Va, the charging control circuit 5 judges that it is impossible to discharge, and brings the switches S1 and S3 into OFF state. The state is then left in a standby state until the voltage V1 is increased up to the threshold value Vb by charging the C1 again. Thereafter, the charging control circuit 5 repeatedly executes transfer of the charge from the C1 to C3, and charge of the C1 until the voltage V3 of the C3 reaches the threshold value Vb to enable the discharge.

Likewise, the storage elements C4 to C6 are charged sequentially. In the case where the voltage V2 of the storage element C2 with priority higher than that of the storage element C3 in charging drops to reach the threshold value Va, and it becomes impossible to discharge, the operation for charging the storage element C3 is interrupted. Then the operation is switched to charge the storage element C2.

As described above, the charging control circuit 5 of the embodiment charges the storage elements from C1 to C6 in sequence according to the priority order. Especially, the storage element C1 (primary storage element) is charged with the highest priority, and exhibits lower capacity value than others. The generation control circuit 4 may be started in a short time from start of power generation performed by the power generation element 2, the state of which may be maintained. The power generation element 2 is allowed to generate electric power with high efficiency for the most period of such operation.

Each of the storage elements C2 to C5 (secondary storage element) exhibits the minimum necessary capacity value for the respective loading blocks 10a to 10d of the loading device 10 to be connected, and is charged sequentially in the priority order. This makes it possible to start the respective loading blocks in a short time in accordance with the priority order.

In the time segment where the power generation element 2 becomes unable to generate electric power, the charge stored in the storage element C6 (tertiary storage element) is supplied to the storage elements C2 to C5 (secondary storage element). This makes it possible to prevent interruption of power supply to the respective loading blocks, and to minimize the interruption period.

The autonomous power supply system according to the embodiment allows the system having the power generator element for generating electric power from minimal and unstable environmental energy to minimize the period taken for starting the generation control circuit or the outage period. This makes it possible to maximize electric power generation of the power generation element. As a result, the wireless sensor terminal with the above-structured autonomous power supply system is capable of starting the sensor function in a short time from start-up of the device, and preventing interruption of the sensor operation or minimizing the operation interruption period even if power generation of the power generation element is stopped.

The present invention is not limited to the embodiment as described above, and may include various modifications. The above embodiment has been explained in detail for better understanding of the present invention, and is not necessarily restricted to the one provided with all the structures which have been described. It is possible to have the part of the structure of the embodiment added to, removed from and replaced with the other structure.

All or some of the respective structures, functions, processing part, processing means may be realized as hardware through design with the integrated circuit, for example. Alternatively, they may be realized as software to allow the processor to interpret and execute the program for realizing the respective functions. The information as the program, table, file and the like for realizing the respective functions may be stored in the recording device such as the memory, hard disk and SSD (Solid State Drive), or the recording medium such as the IC card, SD card and DVD. The control lines and data lines considered as being necessary for the explanation are illustrated, and not necessarily represent all of them. Actually, it is possible to assume that almost all the structures are interconnected with one another.

What is claimed is:

1. An autonomous power supply system for supplying electric power generated by a power generation element to a loading device, comprising:
   a generation control circuit which controls power generation efficiency of the power generation element;
   a storage element group which charges the electric power generated by the power generation element; and
   a charging control circuit which controls a charging operation and a discharging operation of the storage element group,
   wherein the storage element group includes a primary storage element for supplying electric power to the generation control circuit and the charging control circuit, and a secondary storage element for supplying electric power to the loading device; and
   the primary storage element is first charged with the electric power generated by the power generation element until a voltage of the primary storage element reaches a first predetermined threshold value, and when the first predetermined threshold value is reached, the secondary storage element is subsequently charged by charge supplied from the primary storage element until the voltage of the primary storage element reaches a second predetermined threshold value.

2. The autonomous power supply system according to claim 1, wherein a capacity value of the primary storage element is smaller than a capacity value of the secondary storage element.

3. The autonomous power supply system according to claim 2, wherein the secondary storage element includes a plurality of storage elements for supplying electric power to a plurality of loading blocks of the loading device.

4. The autonomous power supply system according to claim 3, wherein a priority is given to the plurality of storage elements in accordance with a priority order of the plurality of loading blocks.

5. The autonomous power supply system according to claim 2,
wherein the storage element group further includes a tertiary storage element which is charged subsequent to the primary storage element after charging of the primary and the secondary storage elements; and
when electric power is not generated by the power generation element, the tertiary storage element supplies electric power to the primary and the secondary storage elements.

6. The autonomous power supply system according to claim 2, wherein the charging control device judges whether or not it is possible to discharge the storage elements by comparing each voltage of the storage elements with a one or more of the first and second predetermined threshold values, and executes charging of the storage element when it is judged that it is impossible to discharge in accordance with a preset priority order of the respective storage elements.

7. The autonomous power supply system according to claim 3, wherein charge is not performed among the plurality of storage elements included in the secondary storage element.

8. The autonomous power supply system according to claim 1, wherein the power generation element collects at least one kind of environmental energy including environmental light, vibration, heat and electric wave, and converts the environmental energy into electric energy.

* * * * *